Dec. 16, 1941.  E. V. SORENY  2,266,447
FLASHLIGHT SYNCHRONIZING APPARATUS
Filed May 7, 1940  2 Sheets-Sheet 1
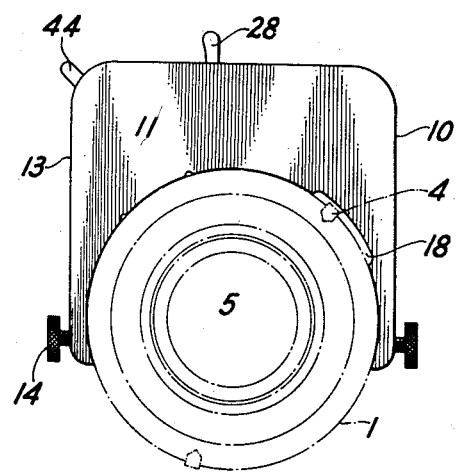
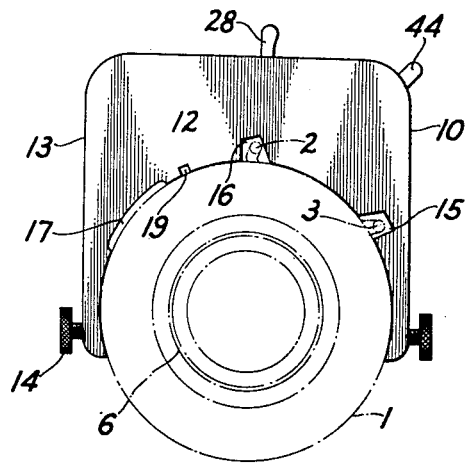
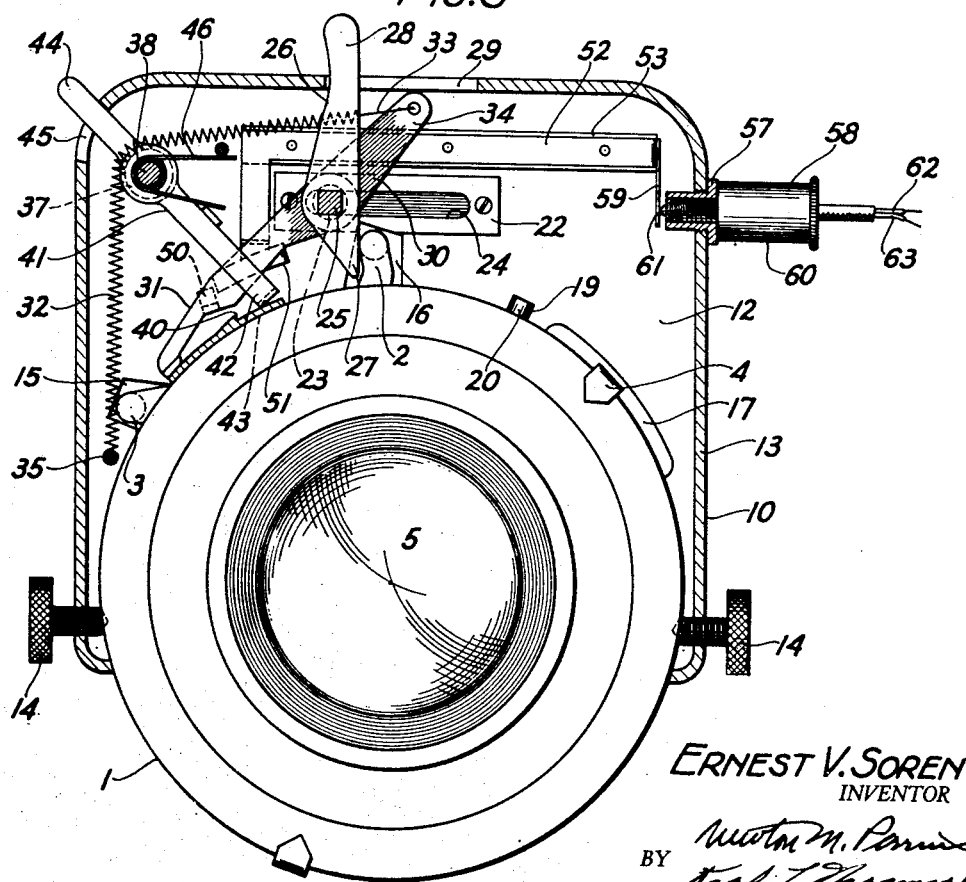
Ernest V. Soreny
INVENTOR
BY
ATTORNEYS Dec. 16, 1941. E. V. SORENY 2,266,447
FLASHLIGHT SYNCHRONIZING APPARATUS
Filed May 7, 1940 2 Sheets-Sheet 2
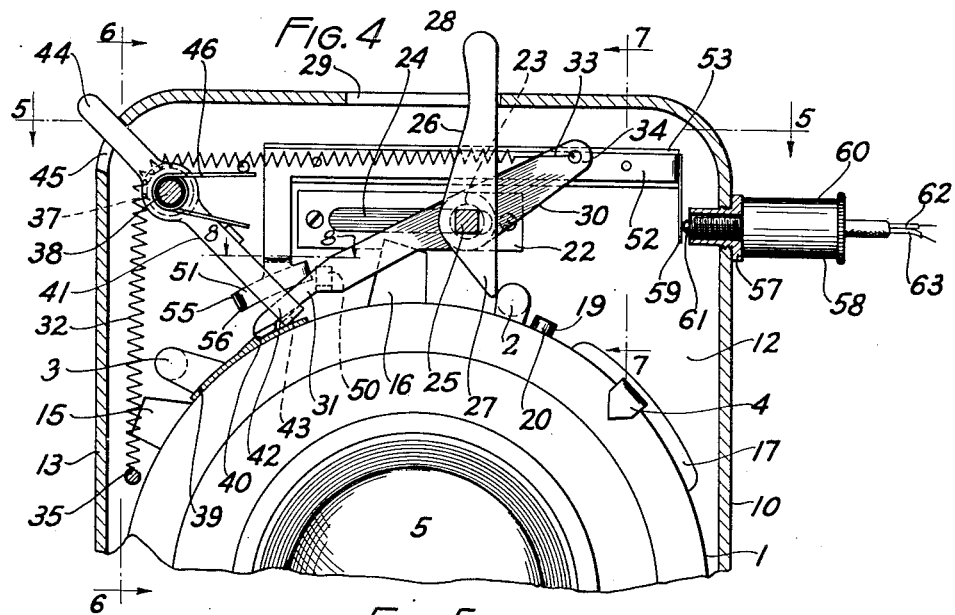
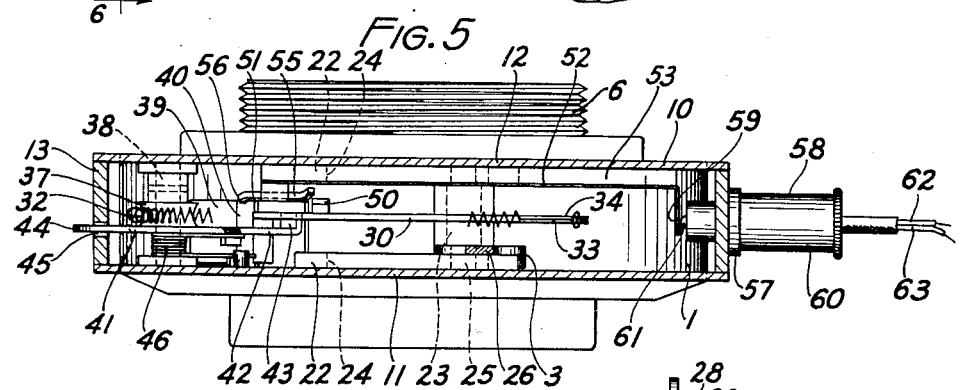
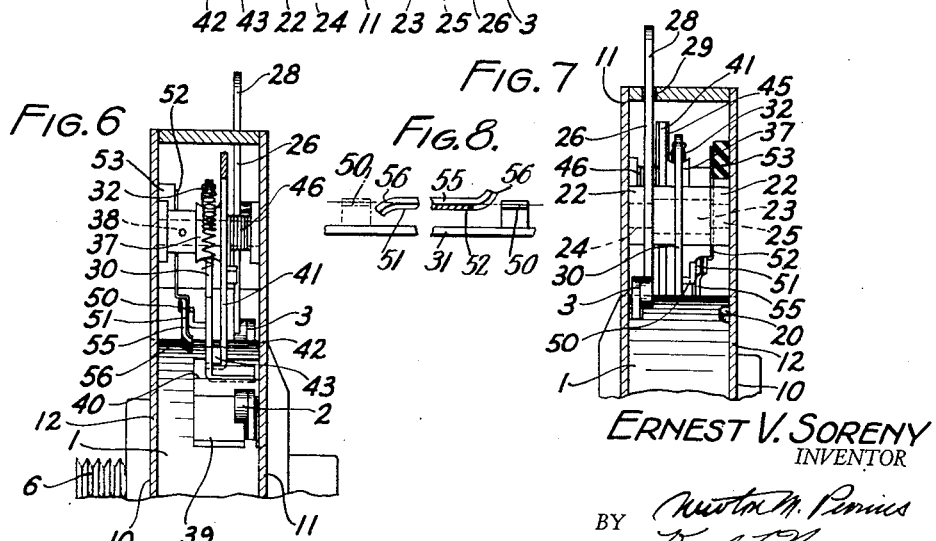
ERNEST V. SORENY
INVENTOR Patented Dec. 16, 1941

2,266,447

UNITED STATES PATENT OFFICE 2,266,447

FLASHLIGHT SYNCHRONIZING APPARATUS

Ernest V. Soreny, Rochester, N. Y., assignor to Eastman Kodak Company, Rochester, N. Y., a corporation of New Jersey Application May 7, 1940, Serial No. 333,835

12 Claims. (Cl. 67—29)

The present invention relates to flashlight synchronizing apparatus for cameras, and particularly to a flashlight synchronizing unit adapted to be detachably mounted on a camera shutter when it is desired to take flashlight pictures.

It is a recognized fact that flashlight synchronizing arrangements in which the switch for the flashlight circuit is arranged to be actuated directly by the movement of the shutter operating mechanism are most accurate and are capable of more precise adjustment than arrangements in which the switch and shutter are operated in timed relation by a mechanical linkage or an electrical operating circuit. There are known photographic shutters having the switch for the flashlight circuit built directly thereinto so as to be operated by, and in proper timed relation with, the shutter operating mechanism. This is accepted to be the ideal arrangement and is adaptable to new shutters or to rebuilt shutters. However, to those persons already in possession of a camera without a built-in synchronizer of the type set forth and who want a flashlight synchronizing arrangement working on this principle there is at present no alternative other than to have the shutter of their camera rebuilt to include the flashlight circuit switch.

Therefore, one object of the present invention is to provide a flashlight synchronizing unit which can be detachably mounted to any camera shutter and operate on precisely the same principle, and with the same accuracy, as shutters having built-in flash synchronizing arrangements.

Another object is to provide a flash synchronizing unit of the type described which includes mechanism for operating the shutter, and includes a switch operated in timed relation to, and by, or in conjunction with, the shutter operating mechanism.

And still another object is to provide a flash synchronizing unit in which the switch therein is arranged to be readily connected in series with a source of current and a flash-lamp.

A further object is to provide a flash synchronizing unit of the type described having a shutter operating mechanism including a shutter setting member and a shutter trigger release member for setting and releasing the shutter when moved between a cocked position and a release position, respectively.

And yet another object is to provide a flash synchronizing unit of the type described in which the switch for controlling the flashlight circuit is adapted to be actuated by the movement of the release member prior to, and during, the release of the shutter thereby, whereby the switch can be considered as controlled by the moving part of the shutter operating mechanism and thereby possess the advantages of precise operation claimed for such an arrangement.

Another object is to provide a flash synchronizing unit of the type described wherein one of the switch contacts is carried directly by, or constitutes, a shutter release member, and the second switch contact is disposed to be engaged thereby in proper timed relation to the release of the shutter to account for the lag characteristics of flash lamps and the photographic shutter with which it is associated.

Another object is to so arrange the switch contacts that the same are electrically engaged when the release member moves to its release position, but are not electrically engaged during the movement of the release member to its cocked position to set the shutter.

And still another object is to provide a flash synchronizer of the type described which is simple in construction, efficient in operation, and neat and compact in appearance.

The novel features that I consider characteristic of my invention are set forth with particularity in the appended claims. The invention itself, however, both as to its organization, and its method of operation, together with additional objects and advantages thereof, will best be understood from the following description when read in connection with the accompanying drawings in which, Fig. 1 is a front elevation of a flash synchronizing unit constructed in accordance with a preferred embodiment of my invention and shown in operative association with a photographic shutter, the shutter being shown in broken lines, Fig. 2 is a rear elevation of the synchronizing unit shown in Fig. 1, Fig. 3 is an enlarged sectional view of the flash synchronizing unit attached to a photographic shutter, the parts of the shutter and shutter operating mechanism of the unit being shown in a shutter releasing position, Fig. 4 is a view similar to Fig. 3, but with the shutter operating mechanism and the shutter parts shown in a cocked, or set, position, Fig. 5 is a section taken substantially on line 5—5 of Fig. 4, Fig. 6 is a section taken substantially on line 6—6 of Fig. 4, Fig. 7 is a section taken substantially on line 7—7 of Fig. 4, and Fig. 8 is an enlarged sectional view taken substantially on line 8—8 of Fig. 4, and showing the structure and relationship of the two switch contacts of the lamp circuit, one of which is connected to and moved by the shutter operating mechanism.

Like reference characters refer to corresponding parts throughout the drawings.

The photographic shutter to which a flash synchronizing unit constructed in accordance with the present invention is to be detachably mounted forms no part of the invention per se, and may be of any well-known type, so that a detailed description of the same is not deemed necessary in this specification. Referring to the drawings, the photographic shutter may be one of the well-known between-the-lens type and comprise a circular casing 1 in which the shutter mechanism is located. As is customary, this shutter may include a shutter setting lever 2 extending radially from the periphery of the casing and through an elongated slot therein to move between a set position, shown in Fig. 4, where it tensions the shutter, and a release position, shown in Fig. 3, which it assumes upon release of the shutter. The shutter may also be provided with a trigger 3 extending radially from the casing 1 and movable between a tensioned position, shown in Fig. 4, and a release position, shown in Fig. 3. As is well known in the art the shutter is set when the setting lever 2 is moved from the position shown in Fig. 3 to that shown in Fig. 4, and the shutter is released by a depression of the trigger 3 whereupon the trigger and the setting lever 2 move from the position shown in Fig. 4 to the position shown in Fig. 3. As is well known, the shutter may include a speed setting arm 4 which extends from the periphery of the casing 1 and moves circumferentially of the same over a speed scale, not shown, for adjusting the speed of operation of the shutter. A photographic shutter of the type illustrated usually includes a lens 5 and has a threaded shoulder 6 on the rear side thereof which is adapted to be screwed into a threaded opening in the lens board of the camera for mounting the shutter thereon.

Coming now to the present invention, a flashlight synchronizing unit constructed in accordance with a preferred embodiment of the present invention may comprise a housing 10 including a front plate 11 and a rear plate 12 spaced apart, and connected together, by a U-shaped wall 13, as clearly shown in the drawings. The housing 10 is adapted to be mounted on the top of the shutter casing 1 as clearly shown in Figs. 1–4 and the lower ends of each of the front and rear plates is provided with an arcuate cut-out to conform to the contour of the periphery of the shutter casing which they engage to support the housing on the casing. The lower ends of the plates 11 and 12 extend below the horizontal diameter of the casing when the housing is mounted thereon so that said housing cannot be slipped onto, or off of, the casing radially; and the set screws 14 threaded through the lower ends of the wall 13 are adapted to engage the periphery of the casing to prevent the housing from shifting circumferentially and longitudinally of the casing after being located thereon.

The synchronizing unit may be slipped onto the shutter from the front and axially thereof, and to permit this the rear plate 12 is provided with notches 15, 16, and 17 through which the trigger 3, setting lever 2, and the speed setting arm 4, respectively, can pass to permit the housing to be slipped onto the shutter casing. It will be noticed that the notches 15, and 16 are so located that the trigger 3 and the setting lever 2 must be in their release positions when the housing is slipped onto and off of the shutter, because in their set position, see Fig. 4, these parts do not line up with the notches mentioned. The front plate 11 is provided with an elongated notch 18 through which the speed setting arm 4 is adapted to extend and be available for manual adjustment. For the purpose of locating the housing in a definite position on the periphery of the shutter casing so that the shutter operating parts therein will cooperate with the shutter trigger 3 and the setting lever 2, as will be fully set out hereinafter, the rear plate 12 of the housing 1 is provided with a notch 19 which is adapted to engage a locating pin 20 extending radially from the periphery of the casing and located in the plane assumed by said rear plate when the housing is placed on the shutter, see Figs. 2, 3, and 7. Any pin, or lug, normally extending from the periphery of the shutter casing may serve in the capacity of this locating pin, but if the shutter lacks a part which is suitable for this purpose, the casing may be tapped to receive such a pin.

The housing 10 includes an operating mechanism for manually setting and releasing the shutter, and such mechanism will now be described. A slotted way 22 is bolted to each of the opposing faces of the rear and front plates of the housing, and a stud 23 extending between the plates has its opposite ends slidably engaging the slot 24 in each of said ways so that said stud is free to slide from one end of the slot to the other. This stud includes a squared portion 25 with which the setting member 26 is in engagement so as to move with the stud, and so as to be incapable of rotation relative thereto. This shutter setting member includes a nose 27 which is adapted to engage the setting lever 2 of the shutter, and includes an arm 28 which extends through an elongated slot 29 in the wall 13 and which can be grasped by the operator for manually moving the stud 23 to the right, looking at Figs. 1 and 2, whereby the nose 27 engages and moves the setting lever 2 to its set position, see Fig. 2.

Pivoted on a circular portion of the stud 23 is a shutter release member 30. This release member necessarily moves with the stud 23, as well as pivoting relative thereto, and includes an extended portion 31 the end of which is adapted to engage and move the shutter trigger 3 to release the shutter when the same moves to the left with the stud 23. The stud 23, and along with it the release member 30 and shutter setting member 26, is normally moved to the left end of the slot, or to a shutter releasing position, by a spring 32. One end of this spring may be connected at 33 to an extension 34 of the release member 30 and at the other end to a pin 35 fixed to, and extending between, the front and rear plates. The direction of the spring 32 may be changed without the spring losing its effectiveness by passing the spring over a grooved roller 37 rotatably mounted on a pin 38 extending between the two plates.

The inner face of the front plate 11 is provided with an elongated arcuate guiding member 39 extending transversely of, and into, the plane of movement of the extended portion 31 of the release member so as to act as a limiting stop toward which the portion 31 is adapted to be normally moved by the spring 32 tending to pivot the release member about the stud 23. The guiding member 39 is preferably of a length substantially the same as that of the path of movement of the portion 31 in moving between its release position, shown in Fig. 3, and its cocked position, shown in Fig. 4, so that it forms a guiding surface for the end of the same at all times to prevent it from dropping below the opening in the bottom of the housing when said housing is removed from the shutter casing.

It is essential that the shutter operating mechanism in the housing is capable of being releasably latched in a cocked, or shutter setting, position to be released therefrom at the option of the operator. To this end the guiding member 39 is provided with a notch 40 into which the end of the portion 31 of the release member is adapted to drop when the stud 23 has been moved to the right a sufficient distance for the setting member 26 to move the shutter setting lever to a shutter setting position. The spring 32 will normally pivot the release member 30 in a direction to hold the portion 31 thereof in the notch 40 until the release member is pivoted upwardly to disengage the same therefrom. For releasing the shutter operating mechanism from the cocked position a double ended lever 41 is pivoted on the pin 38. One end 42 of this lever extends adjacent the extended portion 31 of the release member and includes a lug 43 arranged to extend transversely of the plane of said portion 31, while the other end 44 of the lever extends through an elongated slot 45 in the wall 13 to provide an accessible part which can be manually depressed to pivot the lever and release the portion 31 from the notch 40. The lever 41 is normally moved to an inoperative position by the spring 46, but by exerting a downward pressure on the end 44 thereof said lever can be pivoted against the action of the spring whereupon the lug 43 on the other end of the lever will engage and move the portion 31 of the release member from the notch 40 to release the mechanism. Just as soon as the end of portion 31 is raised out of the notch 40 the spring 32 will immediately move the stud 23, the setting member 26, and the release member 30 to the left during which movement the portion 31 of the release member 30 will engage and move the shutter trigger 3 to the left to release the shutter. It is imperative that the recoil speed of the shutter operating mechanism in the housing be greater than the recoil speed of the shutter setting lever 2 so that the nose 27 of the setting member 26 will not retard the set speed of the shutter. This contingency can obviously be met by adjustment of the tension in the spring 32, or by selecting a spring having a suitable tension.

For the purpose of synchronizing the flashing of a lamp with the opening of a camera shutter the following structure is provided. The extended portion 31 of the release member is provided with a turned-up lug 50 which forms one contact of a switch controlling the flash circuit as hereinafter set forth. This lug 50 necessarily moves over a given path with the release member 30 in moving between its cocked and release positions. The other switch contact 51 is electrically and mechanically connected to a conductor strip 52 fixed to the rear plate 12 and insulated therefrom by a suitable insulating material 53. The contact 51 is disposed in the path of movement of the lug 50 which forms the first switch contact so as to be engaged thereby at a given instant in, and during a given period of the movement of the release member from its cocked to its release position.

As is well known in the art all flash lamps have a lag characteristic, as the lapse of time between the instant the lamp is excited and the instant it reaches its maximum illumination is known as. This lag characteristic in most flash lamps is in the neighborhood of .020 of a second.

In addition, all photographic shutters have a lag characteristic which the time lapse between the instant the trigger is operated until the shutter is fully opened is commonly known as. This lag characteristic of the shutters may vary between wide limits depending upon the type of shutter under consideration, but is generally in the neighborhood of .008 of a second for shutters of the type disclosed. Proper synchronization of the flashing of a lamp and the opening of a shutter necessitates the shutter being opened at the instant the lamp is at its peak of illumination, or if a slow shutter speed is being used, during the time necessary to include that portion of the flash adjacent and including the peak of illumination thereof. It will be apparent then that proper synchronization must account for the lamp and shutter lag characteristics, and that such an accounting will necessitate the completion of the lamp circuit prior to the actual release of the shutter. If the lamp has a lag of .020 of a second and the shutter has a lag of .008 of a second then it will be apparent that the lamp circuit must be completed approximately .012 of a second prior to the actual release of the shutter.

In the present synchronizing unit these lag characteristics of the lamp and shutter are accounted for in the following manner. According to Fig. 4 it will be noticed that when the release member 30 is in its cocked position the switch contacts 50 and 51 are separated, and that the end of portion 31 is spaced from the trigger 3. It should also be noticed that the distance between the two switch contacts and the distance between the end portion 31 of the release member 30 and the trigger 3 at this time is different so that when the release member starts to move from its cocked position the switch contacts will be brought into engagement a given time prior to the time the portion 31 of the release member 30 engages and operates the trigger to release the shutter. Thus the stationary contact 51 is disposed relative to the movable contact so that the two will be brought into engagement at a desired time prior to the actual release of the shutter by the engagement between the release member 30 and the trigger 3, and for the purpose of accounting for the lag characteristics of the flash lamp and of the shutter. While the switch contacts 50 and 51 are shown as having a definite relation to one another for synchronization within certain ranges of shutter speeds, it will be readily appreciated that one could be made adjustable relative to the other so as to obtain synchronization with shutter speeds out of said range.

In order to permit a new lamp to be inserted in the flash circuit for a burned one prior to the resetting of the shutter it is necessary to insure against the flash circuit control switch being closed during the setting operation of the shutter. For this purpose the switch contact 51 has an insulated face 55 which may be made of an insulating material and attached to the contact proper, or there may be a metal face attached to the contact proper but insulated therefrom by a sheet of insulating material, or the like. Referring to Figs. 5 and 6, it will be noticed that the contact as a whole is mounted substantially in the plane of movement of the contact 50 and has its opposite ends flared out, as shown at 56, in opposite directions transversely of the plane of movement of said contact 50. Thus when the release member moves from its cocked position to its release position, see Figs. 3, 4 and 5, the lug 50 engages and slides along the contact 51 to close the lamp circuit. On the other hand, when the release member is moved in the opposite direction to its cocked position, see Fig. 8, the contact 50 engages the insulated face 55 of the contact 51 so that the lamp circuit is not closed. It goes without saying that the supporting arm for the contact must be resilient so as to allow the same to flex transversely of the plane normally assumed thereby when the lug 50 engages the flared ends of the contact upon movement thereacross. The above described engagement of contact 50 with the conductive and insulated faces of contact 51 during its movement in opposite directions will be readily understood by referring to Fig. 8 in which the normal plane of the contact 51 and the plane of movement of the contact 50 is shown by a broken line with the flared ends 56 of the contact 51 extending transversely of this plane in opposite directions.

The two contacts 50 and 51 may be electrically connected in series with the flash lamp and source of current in any number of suitable ways. One way in which this may be accomplished is to have the wall 13 provided with a threaded socket 57 into which an electrical plug 58 may be threaded. This plug 58 may be the type fully described and set out in pending U. S. patent application Serial Number 296,113, filed September 22, 1939, under the name of William A. Riddell, and since the same forms no part of the present invention a detailed description of the same herein is not deemed necessary. So far as the present invention is concerned it will suffice to point out that the two electrical contacts of the plug 58 are the metal shell 60 and the head 61 thereof, said contacts being connected in series with a source of current in a flash lamp, not shown, by wires 62 and 63. When the plug 58 is screwed into the threaded socket the contact 61 thereof will engage an arm 59 and the conductor strip 52 and be electrically connected to the switch contact 51. At the same time the metal shell of the plug will be grounded to the housing 10 and the shutter operating parts therein, which parts are metal and in contact with one another, whereby the lug 50 on the release member 30 will be connected into the flash circuit and thereby become a switch contact. The batteries and flash lamp may be contained in a portable unit including the electrical plug 58, as shown in the above noted pending patent application, but not shown herein because it forms no part of the present invention.

The use and operation of my flash synchronizing unit will now be clearly set forth. With the shutter and the shutter operating mechanism of the unit both in a release position the unit is slipped onto the shutter from the front and axially thereof, and the same will be securely attached to the shutter by turning down the set screws 14. The shutter operating parts of the synchronizing unit of the shutter will be in the relative positions shown in Fig. 3. If the electrical plug 58 connected to a source of current and a flash lamp has not already been screwed into the socket 57 it should be now, the switch contacts 51 and 50 of the unit will then be connected into the circuit. Now the shutter setting arm 28 is pushed to the right, looking at Figs. 3 and 4, until the end of portion 31 drops into the notch 40 whereupon the shutter operating mechanism is latched in a cocked position. During this movement the nose 27 of the setting member 26 has moved the shutter setting lever 2 to a set position, see Fig. 4, and the device is ready for making an exposure. Now by pressing downwardly upon the end 44 of the release member 41 the end 42 will be moved upwardly to engage and raise the portion 31 of the release member from the notch 40 whereupon the spring 32 will act to move the shutter operating mechanism in the housing to the left and actuate the shutter trigger 3 to release the shutter.

From the above description it will be apparent that I have provided a flashlight synchronizing unit which although it is detachably mounted to the exterior of the shutter casing, possesses the operating advantages of a flash synchronizing arrangement built into the shutter proper. Inasmuch as the switch contact 50 is carried directly by the shutter release member 30 to move into contact with the second switch contact 51 upon movement of said release member to operate the shutter the result is the same as if the switch contact were directly built into the operating mechanism of the shutter itself. In addition, the particular arrangement of parts makes it possible to obtain a necessary time interval between the closing of the lamp circuit and the opening of the shutter for obtaining accurate synchronization. The particular arrangement of switch contacts makes it possible to complete the lamp circuit during the setting operation of the shutter so that a burned lamp can be replaced by a new lamp at any time after the shutter is operated without danger of a premature flashing thereof. The synchronizing unit is neat in appearance and compact so that its presence on a camera shutter is not offensive and does not make the camera unwieldy to handle. The shutter operating mechanism in the unit is simple and efficient in operation, and can stand rough usage without danger of being broken or thrown out of adjustment.

Although I have shown and described certain specific embodiments of my invention, I am fully aware that many modifications thereof are possible. My invention, therefore, is not to be restricted except insofar as necessitated by the scope of the appended claims.

Having thus described my invention, what I claim is new and desire to secure by Letters Patent of the United States is:

1. The combination with a camera shutter including a casing, a setting member and a trigger extending from said casing for setting and releasing said shutter, respectively, of a flashlight synchronizing unit comprising a housing detachably mounted on said shutter casing, means in said housing adapted to engage and move said setting member and trigger to set and release said shutter respectively, a normally open switch in said housing adapted to be connected in series with a source of current and a flash lamp, said switch associated with said shutter setting and release means to be closed thereby in proper timed relation to the opening of said shutter when said means operates to move said trigger to release the shutter.

2. The combination with a camera shutter including a casing, a setting member and a trigger extending from said casing for setting and releasing said shutter, respectively, of a flashlight synchronizing unit comprising a housing detachably mounted on said shutter casing, means in said housing adapted to engage and move said setting member and trigger to set and release said shutter respectively, a stationary switch contact and a movable switch contact in said housing and adapted to be connected in series with a source of current and a flash lamp, said movable contact connected to said shutter operating means in said housing to move therewith and adapted to be spaced from said stationary contact when said shutter is in a shutter setting position, and adapted to be moved into engagement with said stationary contact when said means moves to release said shutter, and in proper timed relation to the opening of said shutter.

3. The combination with a camera shutter including a casing, a setting member and a trigger extending from said casing for setting and releasing said shutter, respectively, of a flashlight synchronizing unit comprising a housing detachably mounted on said shutter casing, means in said housing adapted to engage said shutter setting member and movable to and from a cocked position wherein it sets said shutter, means in said housing for engaging and moving said shutter trigger and connected to said setting means to move therewith, means for releasably locking said shutter setting means in a cocked position, a pair of switch contacts in said housing adapted to be connected in series with a source of current and a flash lamp, one of said switch contacts connected to said setting member to be moved over a given path in conjunction with a movement thereof, the other switch contact being stationary and disposed in the path of said movable contact to be engaged thereby in proper timed relation to the opening of said shutter.

4. The combination with a camera shutter including a casing, a setting member and a trigger extending from said casing for setting and releasing said shutter, respectively, of a flashlight synchronizing unit comprising a housing detachably mounted on said shutter casing, a shutter setting and releasing mechanism mounted in said housing to move between a cocked position, wherein it engages and moves said shutter setting member to a shutter setting position, and a release position, wherein it releases said setting member and engages and moves said trigger to release said shutter, means for releasably locking said mechanism in its cocked position, a pair of switch contacts in said housing adapted to be connected in series with a source of current and a flash lamp, one of said contacts connected to said shutter setting and releasing mechanism to move therewith over a given path, the other switch contact being stationary and disposed in the path of movement of said first contact to be engaged thereby in proper timed relation with an opening of the shutter, and means for preventing electrical engagement of said switch contacts during movement of said mechanism to said cocked position from said release position.

5. The combination with a camera shutter including a casing, a setting member and a trigger extending from said casing for setting and releasing said shutter, respectively, of a flashlight synchronizing unit comprising a housing detachably mounted on said shutter casing, a shutter setting member mounted in said housing to move to and from a cocked position, wherein it engages and moves said shutter setting member to a shutter setting position, a shutter release member movable to and from a set position and adapted during movement from said set position to engage and operate said trigger to release said shutter, said shutter release member connected to said shutter setting member to be moved to said set position when said setting member is moved to its cocked position, a pair of switch contacts in said housing adapted to be connected in series with a source of current and a flash lamp, one of said contacts connected to the shutter release member to move therewith over a given path, the second contact being stationary and disposed in the path of said first contact to be electrically engaged thereby prior to the actual release of the shutter and in proper timed relation to the opening thereof, and means for preventing said first contact from electrically contacting said second contact during movement of said shutter release member to its set position.

6. The combination with a camera shutter including a casing, a setting member and a trigger extending from said casing for setting and releasing said shutter, respectively, of a flashlight synchronizing unit comprising a housing detachably mounted on said shutter casing, a shutter setting member mounted in said housing to move to and from a cocked position, wherein it engages and moves said shutter setting member to a shutter setting position, a shutter release member movable to and from a set position and adapted during movement from said set position to engage and operate said trigger to release said shutter, said shutter release member connected to said shutter setting member to be moved to said set position when said setting member is moved to its cocked position, means normally acting to move said shutter setting member and shutter release member from their cocked and set positions, respectively, means for releasably locking said two members in their cocked and set positions, a pair of switch contacts in said housing adapted to be connected in series with a source of current and a flash lamp, one of said contacts connected to the shutter release member to move therewith over a given path, the second contact being stationary and disposed in the path of said first contact to be electrically engaged thereby prior to the actual release of the shutter, and means for preventing said first contact from electrically contacting said second contact during movement of said shutter release member to its set position.

7. The combination with a camera shutter including a casing, a setting member and a trigger extending from said casing for setting and releasing said shutter, respectively, of a flashlight synchronizing unit comprising a housing detachably mounted on said shutter casing, a shutter setting member mounted in said housing to move to and from a cocked position, wherein it engages and moves said shutter setting member to a shutter setting position, a shutter release member movable to and from a set position and adapted during movement from said set position to engage and operate said trigger to release said shutter, said shutter release member connected to said shutter setting member to be moved to said set position when said setting member is moved to its cocked position, means normally acting to move said shutter setting member and shutter release member from their cocked and set positions, respectively, a latch member in said housing adapted to be engaged by said shutter release member when the same is moved to its set position and for releasably holding said members in their set and cocked positions, means for disengaging said latch member and shutter release member from one another, a pair of switch contacts in said housing adapted to be connected in series with a source of current and a flash lamp, one of said contacts connected to said shutter release member to move therewith over a given path, the second contact being stationary and disposed in the path of said first contact to be electrically engaged thereby prior to the actual release of the shutter, and means for preventing said first contact from electrically contacting said second contact during movement of said shutter release member to its set position.

8. A flashlight synchronizing unit adapted for use with a camera shutter including a casing, a setting lever, and a trigger extending from said casing for setting and releasing said shutter, respectively, said synchronizing unit comprising a housing adapted to be detachably mounted on said shutter casing, means in said housing adapted to engage and move said setting member and trigger to set and release said setting member and trigger, respectively, a normally open switch in said housing adapted to be connected in series with a source of current and a flash lamp, said switch associated with said shutter operating means to be engaged and closed thereby in proper timed relation to the opening of said shutter when said means moves to operate said trigger to release the shutter.

9. A flashlight synchronizing unit adapted for use with a camera shutter including a casing, a setting lever, and a trigger extending from said casing for setting and releasing said shutter, respectively, said synchronizing unit comprising a housing adapted to be detachably mounted on said shutter casing, a shutter setting and releasing mechanism mounted in said housing to move between a cocked position, wherein it is adapted to engage and move said shutter setting member to a shutter setting position, and a release position, wherein it is adapted to release said setting member and engage and move said trigger to release the shutter, means for releasably locking said mechanism in its cocked position, a pair of switch contacts in said housing adapted to be connected in series with a source of current and a flash lamp, one of said switch contacts connected to a part of said mechanism to move therewith over a given path, and the other switch contact being stationary and disposed in the path of movement of said first contact to be engaged thereby in proper timed relation with an opening of the shutter when said mechanism moves to its release position.

10. A flashlight synchronizing unit adapted for use with a camera shutter including a casing, a setting lever, and a trigger extending from said casing for setting and releasing said shutter, respectively, said synchronizing unit comprising a housing adapted to be detachably mounted on said shutter casing, a shutter setting and releasing mechanism mounted in said housing to move between a cocked position, wherein it is adapted to engage and move said shutter setting member to a shutter setting position, and a release position, wherein it is adapted to release said setting member and engage and move said trigger to release the shutter, means for releasably locking said mechanism in its cocked position, a pair of switch contacts in said housing adapted to be connected in series with a source of current and a flash lamp, one of said switch contacts connected to a part of said mechanism to move therewith over a given path, and the other switch contact being stationary and disposed in the path of movement of said first contact to be engaged thereby when said mechanism is moved to its release position and in proper timed relation with an opening of the shutter, and means for preventing electrical engagement of said switch contacts during movement of said mechanism to said cocked position from said release position.

11. A flashlight synchronizing unit adapted for use with a camera shutter including a casing, a setting lever, and a trigger extending from said casing for setting and releasing said shutter, respectively, said synchronizing unit comprising a housing adapted to be detachably mounted on said shutter casing, a shutter setting member mounted in said housing to move to and from a cocked position and adapted to engage said setting lever of the shutter and move the same during its movement to said cocked position, a release member mounted in said housing to move to and from a set position and adapted to engage and move said trigger during movement from said set position to release the shutter, means for moving said shutter setting member and release member to their cocked and set positions respectively, means for releasably locking said members in said positions, a pair of switch contacts mounted in said housing and adapted to be connected in series with a source of current and a flash lamp, one switch contact connected to said release member to move therewith over a given path, the other contact being stationary and disposed in the path of said first contact to be engaged thereby during movement of said release member from its set position and at a given time prior to the instant said release member operates said trigger to release the shutter, whereby the lag characteristics of the lamp and shutter are accounted for to insure proper synchronization.

12. A flashlight synchronizing unit adapted for use with a camera shutter including a casing, a setting lever, and a trigger extending from said casing for setting and releasing said shutter, respectively, said synchronizing unit comprising a housing adapted to be detachably mounted on said shutter casing, shutter setting and releasing means mounted in said housing to move between a cocked position and a shutter release position, said means including a shutter setting member adapted to engage and move said shutter setting lever to a set position when said means is moved to said cocked position, a release member adapted to engage and actuate said shutter trigger when said means moves from its cocked position to its release position, resilient means normally moving said means to its release position, an arm connected to said setting member and extending through a slot to the outside of said housing for manually moving said means to said cocked position, means for releasably locking said shutter setting and releasing means in said cocked position, a release member extending to the outside of said housing for manually releasing said locking means, a normally open switch in said housing adapted to be connected in series with a source of current and a flash lamp, one contact of said switch connected to said shutter setting and releasing means to move over a given path therewith, the second contact of said switch being stationary and mounted with path of said first contact to be electrically engaged thereby when said shutter setting and releasing means moves from its cocked to its release position and in proper timed relation with the release of said shutter to insure synchronization.

ERNEST V. SORENY.